United States Patent
Lecroart et al.

(10) Patent No.: US 9,325,431 B2
(45) Date of Patent: Apr. 26, 2016

(54) SYSTEM AND METHOD FOR TRANSPORTING ELECTRIC POWER AND PROVIDING OPTICAL FIBER COMMUNICATIONS UNDER SEA WATER

(75) Inventors: Antoine Lecroart, Nozay (FR); Alain Cordier, Nozay (FR)

(73) Assignee: Alcatel Lucent, Bolougne-Billancourt (FR)

( * ) Notice: Subject to any disclaimer, the term of this patent is extended or adjusted under 35 U.S.C. 154(b) by 740 days.

(21) Appl. No.: 13/698,098

(22) PCT Filed: May 16, 2011

(86) PCT No.: PCT/EP2011/057837
§ 371 (c)(1),
(2), (4) Date: Dec. 3, 2012

(87) PCT Pub. No.: WO2011/151158
PCT Pub. Date: Dec. 8, 2011

(65) Prior Publication Data
US 2013/0202285 A1     Aug. 8, 2013

(30) Foreign Application Priority Data
Jun. 3, 2010 (EP) .................... 10305590

(51) Int. Cl.
*H02J 1/00* (2006.01)
*H04B 13/02* (2006.01)
*H04B 3/44* (2006.01)
*H04B 10/80* (2013.01)
*B60L 11/18* (2006.01)
*H02J 5/00* (2016.01)

(52) U.S. Cl.
CPC .............. *H04B 13/02* (2013.01); *H04B 3/44* (2013.01); *H04B 10/808* (2013.01); *B60L 11/182* (2013.01); *H02J 5/005* (2013.01)

(58) Field of Classification Search
USPC .............................. 307/84–85, 104
See application file for complete search history.

(56) References Cited

U.S. PATENT DOCUMENTS

| 5,719,693 | A | 2/1998 | Tanoue | |
|---|---|---|---|---|
| 2003/0021556 | A1 | 1/2003 | Toth et al. | |
| 2003/0108351 | A1 | 6/2003 | Feinberg et al. | |
| 2004/0130215 | A1 | 7/2004 | Muramatsu et al. | |
| 2010/0316375 | A1* | 12/2010 | Kram | H04B 10/808 398/25 |
| 2011/0058806 | A1* | 3/2011 | Sabet | H04B 10/03 398/1 |

FOREIGN PATENT DOCUMENTS

| EP | 1357679 | 10/2003 |
|---|---|---|
| EP | 1841086 | 10/2007 |

(Continued)

*Primary Examiner* — Danny Nguyen
(74) *Attorney, Agent, or Firm* — Patti & Malvone Law Group, LLC

(57) ABSTRACT

A network for transporting communication and power is disclosed. The network comprises terminal stations branching units and subsea nodes connected to a branching unit, wherein at least one connection path between a terminal station and a first branching unit and between the first branching unit and a first subsea node is provided by means of optical fiber, and wherein said first subsea node is adapted to receive a plurality of wavelengths and provide at least one wavelength at an output thereof. The network comprises a first power supply connected to a first cable head of the trunk cable and at least a second power supply connected to a second cable head of the trunk cable. The first power supply and the at least second power supply, supply at least a minimum amount of electric current in the network either individually or in combination, under normal or faulty conditions.

15 Claims, 10 Drawing Sheets

(56) References Cited

FOREIGN PATENT DOCUMENTS

| | | |
|---|---|---|
| JP | 2002164820 | 6/2002 |
| JP | 2003108240 | 4/2003 |
| JP | 2005129991 | 5/2005 |
| JP | 2007510388 | 4/2007 |
| JP | 2009181685 | 8/2009 |
| JP | 2011150492 | 8/2011 |
| WO | 2005043199 | 5/2005 |
| WO | 2005094321 | 10/2005 |

* cited by examiner

SYSTEM AND METHOD FOR TRANSPORTING ELECTRIC POWER AND PROVIDING OPTICAL FIBER COMMUNICATIONS UNDER SEA WATER

CROSS REFERENCE

This application claims the benefit of European patent application No. 100305590.1, filed Jun. 3, 2010 and claims the benefit of PCT patent application No. PCT/EP2011/057837, filed May 16, 2011, the respective contents of which are hereby incorporated by reference in their entirety.

TECHNICAL FIELD

The present invention relates to submarine power transport and submarine communications.

BACKGROUND ART

In some under-sea activities or applications under water equipment are used, at variable distances, where such equipment typically require the supply of power as well as the availability of communication to and from said equipment.

Some examples of such activities or applications may be found in the fields of oil & gas industry, in the scientific research, deep sea sensing for example in relation to seismic sensing where platforms or other installations are provided with under sea equipment at large distances.

SUMMARY

Submarine communication is typically based on the use of optical cables comprising optical fibers. Such cables connect a first terminal station to a second, and possibly more terminal stations to enable communication between such stations such that at least part of the cable is laid under the sea water. The terminal stations may be located at very long distances such as distances between continents. In addition to carrying data for communication, such cables are typically capable of conveying electric power in order to feed equipment that may be located at an intermediate distance between two terminal stations.

In a typical submarine communication, the power is supplied using DC voltages in the order of about 10 KV in order to reduce or minimize the effect of losses suffered in the cable due to attenuation through the distance between the power supply and the equipment receiving it.

Unlike submarine communication systems, in the undersea activities or applications as mentioned above typically electrical cablings are used and the voltages used for the supply of power are typically much lower than the voltages used for the supply of power in a typical submarine telecommunication network using optical cables. Such voltages are typically provided using AC power transport. However, the efficiency of AC electrical power transmission typically decreases rapidly with distance due to the capacitive effect of the cable creating leakage current to ground which typically increases with the cable length. DC power transmission typically does not suffer so much from such limitation and is therefore much more efficient and particularly suitable for long distances (over a few hundred Km).

Furthermore, known solutions suffer from limitations in coverage as regards the number of sites to give service to, or as regards the reach of said service to limited distances.

As regards the availability of communication, said systems have typically relatively limited capabilities. Some of such systems are capable of providing data transfer at relatively low bitrates, typically of the order of a few Kbits to a few tens of Kbits.

However, more recently, systems of the type mentioned above are typically tending to demand higher capacity for communication with more bandwidth and at the same time higher levels of reliability and cost effectiveness as compared to the previous systems. Users of such systems, such as for example oil & gas operators or supplier companies are typically requiring the possibility of running, monitoring and controlling more efficiently their offshore installations.

Furthermore, as such systems are installed under sea water, which in many occasions is in deep water at places that are typically difficult to have regular access to, they typically require a significant operational "life" of the order of 25 years. Therefore, reliability and robustness of such systems are also of significant importance.

Some attempts are known aiming at providing a system which is capable of enabling communication as well as energy transport using conventional submarine telecommunication cables which improve the overall performance of the system as compared to the above-mentioned known systems.

However, it is still desirable to make such systems robust in terms of supply of power throughout the network such that in case of failure in an element of the network the rest of the elements are capable of maintaining their operational capabilities as much as possible.

The solution proposed herein is based on the use of optical fiber communications from one or two terminal stations to a number of distributed sites located on the sea bottom, preferably covering a large area.

Accordingly some embodiments feature a network for transporting communication and power, comprising one or more terminal stations wherein a terminal station may be a station located on land or a fixed or floating station located above sea level, at least one branching unit and at least one subsea node connected to a branching unit, the network further comprising a trunk cable for enabling optical and electric connection between a terminal station and a branching unit and between a branching unit and a subsea node, the subsea node being adapted to receive a plurality of optical wavelengths and provide at least one optical wavelength at an output and being adapted to convert a first DC voltage received from a terminal station to a second DC voltage provided at an output, the first voltage being higher than the second voltage, wherein the network comprises a first power supply connected to a first cable head of the trunk cable and at least a second power supply connected to a second cable head of the trunk cable, wherein the first power supply and the at least second power supply are adapted to supply at least a minimum amount of electric current in the network either individually or in combination, under normal or faulty conditions.

According to some specific embodiments, the network comprises Internet Protocol switching means adapted for implementing Internet Protocol applications at an output of a subsea node.

According to some specific embodiments the network is a ring network.

According to some specific embodiments the network further comprises at least one dummy load adapted to enable current circulation.

According to some specific embodiments the first power supply is configured to supply DC power on the first cable head such that a loop is closed between the first power supply and a sea earth and wherein the at least second power supply is connected in parallel with a dummy load in standby mode.

According to some specific embodiments the first power supply and the at least second power supply are configured to supply power, wherein the first power supply is set to control voltage and the at least second power supply is set to control current on the trunk line.

According to some specific embodiments the first power supply in configured to supply power to the first cable head of the trunk cable, the second power supply supplies power to a second cable head of the trunk cable, and a dummy load is disconnected, wherein a resistive load is connected at a node which is close to a faulty point in the network so as to ensure the presence of current in the subsea node.

According to some specific embodiments the network comprises a third power supply adapted for providing power feed, in case of a failure in the trunk cable, so as to restore DC current on the trunk line as well as enabling communication in the network.

According to some specific embodiments the network comprises a management system configured to set the current and voltage demand to the first and the least second power supplies so as to balance the current equally in at least one node in the network, According to some specific embodiments the subsea node is configured to stop the conversion of the trunk voltage, in case of a fault in a branching unit, from the first voltage value to the second voltage value.

According to some specific embodiments the subsea node is configured to stop the conversion operation if the trunk voltage falls below a predetermined threshold value.

Some embodiments feature a method for transporting communication and power in a network comprising one or more terminal stations wherein a terminal station may be a station located on land or a fixed or floating station located above sea level, at least one branching unit and at least one subsea node connected to a branching unit, the network further comprising a trunk cable for enabling optical and electric connection between a terminal station and a branching unit and between a branching unit and a subsea node, comprising receiving at the subsea node a plurality of optical wavelengths and providing at least one optical wavelength at an output;

converting at the subsea node a first DC voltage received from a terminal station to a second DC voltage provided at an output, the first voltage being higher than the second voltage;

wherein the network comprises a first power supply connected to a first cable head of the trunk cable and at least a second power supply connected to a second cable head of the trunk cable, wherein the first power supply and the at least second power supply, supply at least a minimum amount of electric current in the network either individually or in combination, under normal or faulty conditions According to some specific embodiments the subsea node derives the plurality of optical wavelengths and filters a wavelength that is intended for use of the subsea node, or the subsea node adds at least one wavelength to the trunk cable.

According to some specific embodiments the network further comprises a dummy load, comprising the step of switching the dummy load from a first cable head to a second cable head such that the switching is performed in service at nominal voltage by closing the switch to the second cable head while the dummy load is still switched also to the first cable head and opening the switch to the first cable head after the switching to the second cable head is performed.

According to some specific embodiments in case of an increase in current in the network the following is performed:

dropping a voltage available on the trunk cable to a threshold intermediate value;

stopping the conversion of voltage at subsea nodes;

supplying a current, lower than the increased current enabling a safe switching off of one or more branching units.

These and further features and advantages of the present invention are described in more detail, for the purpose of illustration and not limitation, in the following description as well as in the claims with the aid of the accompanying drawings.

DETAILED DESCRIPTION

Figure 1:
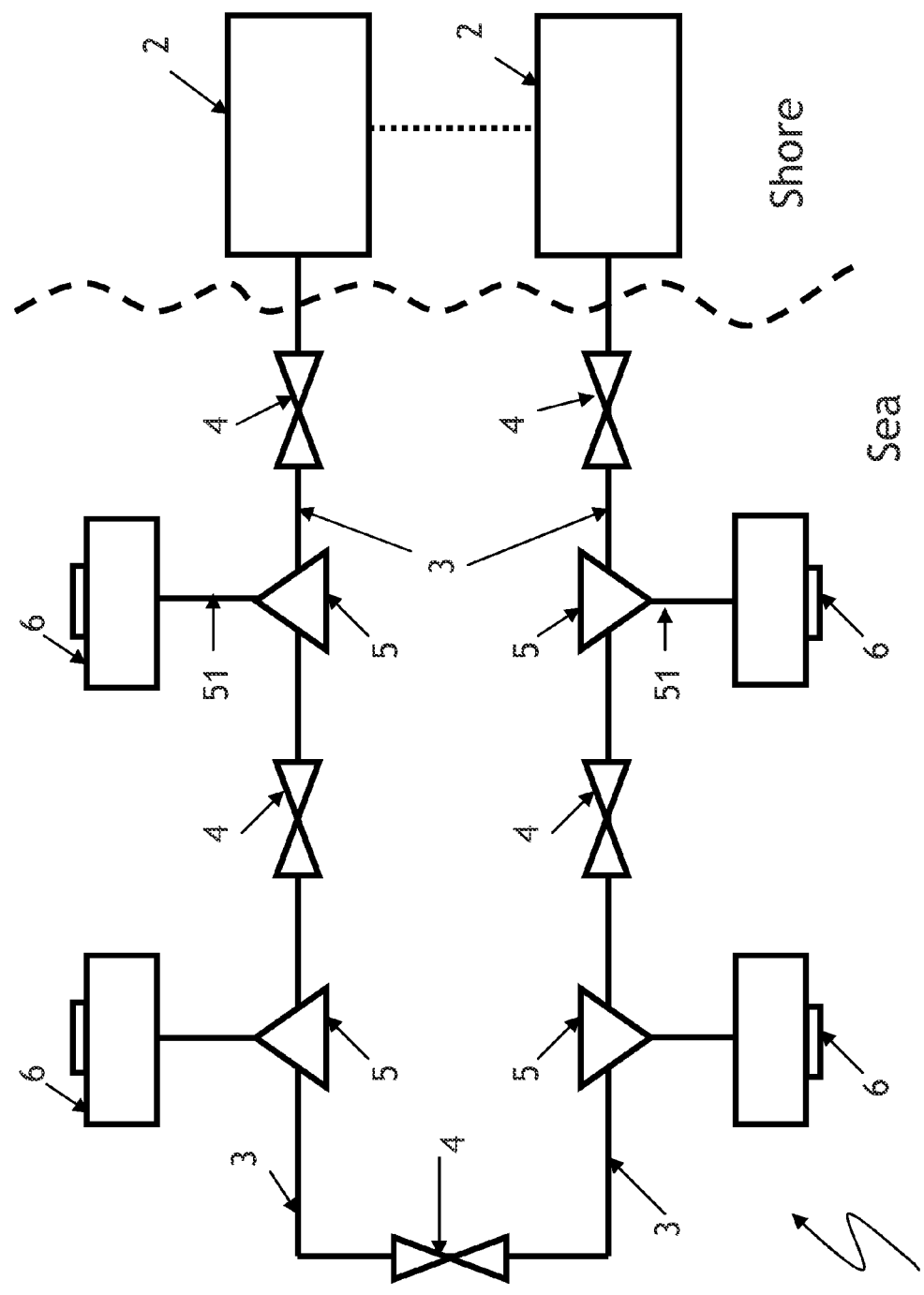
FIG. 1 is an exemplary representation of a network for transporting communication and power according to some embodiments.

As already mentioned above, recent demands for communication and power, for example in a variety of industrial or scientific activities require the possibility of providing a network having various undersea sites used by such activities, wherein such network is capable of providing a subsea user with supply of DC low voltage power (about 400V) and of optical connection at relatively high bitrates. Furthermore, it is desirable that such a network comprises equipment capable of providing reliable service during long operational periods in the range of about 25 years where the need for maintenance of its elements and more particularly of the wet (underwater) equipment is kept at a minimum or at least is reduced as much as possible.

The power distribution of the network uses the principle of sea water return and local medium voltage converters in subsea nodes configured to convert a high voltage of about 10 KV DC which is present on the trunk line of the network to a lower voltage of about 400V DC which is typically useable at the user wet-mate interfaces.

The principle of sea water return relates to a configuration in which the current flows through a single conductor cable and returns via the sea as return conductor (an electrode in contact with the sea water is provided at each node). This configuration may be particularly economical compared to the known AC power distribution which requires at least 2 conductors in single phase systems, or 3 conductors in three-phase systems.

Converters for converting of a high voltage to a voltage as mentioned above are known in the related art.

Such network may use an optically amplified trunk line over which repeaters may be used in order to re-amplify the optical signal at appropriate distances so as to allow the optical signal to reach user sites which are located far away from shore. In such network, optionally a distributed DWDM optical scheme may be used where dedicated wavelengths are distributed to the user gateways (herein also referred to as nodes) so that an end user may have an allocated, or even reserved, capacity for insuring reliable communication in a protected manner. Preferably, such network is in the form of a ring network thereby such allocated or reserved capacity may be made available to the user using both sides of the ring network. Preferably the network further comprises specific power switching devices in order to provide the capability of electrically isolating a node from the rest of the network so as to allow specific local operation on that given node, such as for example maintenance work, while minimizing the impact of such isolation on the other users of the network. Such switching device may be incorporated in a branching unit.

Furthermore, the network may provide for the use of specific IP switching gear in the network and in the nodes so as to allow to implement features related to IP protocols, in particular, the distribution to the end user of precision timing using the PTP protocol. Such precision timing allows for synchronization of events within a network to occur with a high precision, for example of the order of 5 to 10 microseconds, whereas other protocols such as NTP only allow an accuracy of about 1 millisecond. IP switches may be used in subsea nodes in order to collate/distribute the data coming to or going from user interface (typically 6 science ports at 1 GigE each) to the composite 2.5 GBit/s upstream signal that is carried by one wavelength. Two one GigE signals may be mapped into an STM-16 signal to build each wavelength.

FIG. 1 is an exemplary representation of a network 1 for transporting communication and power according to some embodiments. The network 1 comprises terminal stations 2, which may be typically located on a shore or on a fixed or a floating structure above the sea level. In the example of FIG. 1, the terminal stations 2 are shown to be on land (shore). An optical link cable 3, herein also referred to as trunk, connects the terminal stations 2 to subsea equipment. One such subsea equipment may be a repeater 4. As it is known, repeaters are used for re-amplifying an optical signal travelling through the optical cable. Repeaters 4 may be located at predetermined intervals (distances) to ensure such re-amplification.

The trunk cable 3 is configured to convey DC power supply at high voltages for example from about 1 KV to about 50 KV, preferred power supply voltage values may be of about 15 KV, 12 KV and 10 KV (the latter is used in the examples of the embodiments provided herein) and optical signals using one or multiple wavelengths. In some embodiment, the optical signal may be wavelength division multiplexing (WDM), Coarse WDM (CWDM) or Dense WDM (DWDM) signals. The optical signals are capable of enabling communication between the terminal stations and the subsea sites.

The network 1 further comprises at least one branching unit 5. The branching unit 5 couples the trunk line 3 to a branch equipment by means of a branch line 51. According to some embodiments, the branch equipment may be a subsea node 6 that requires supply of voltage and availability of communication with the terminal stations 2. The subsea node may use, or provides at an output thereof voltages which are substantially lower than the voltage present on the trunk line 3. For example the DC voltage used, or supplied, by subsea nodes may vary from 500V to 5V DC depending on the application and the voltage required by the low voltage device that is to be supplied by the subsea node. A preferred voltage value to be used, or supplied, by the subsea node may be about 400V (which is used in the examples of the embodiments provided herein).

Typical low voltage devices referred to above may be communication equipment, instruments, sensors, electrical engines, and the like.

The subsea node 6 may further use optical communication using the optical signals at relatively high bitrates for example above about 100 Mbit/s. Some preferred bitrates are 1 Gbit/s and 10 Gbit/s.

As shown in the figure, the network 1 may preferably be a ring network. This configuration provides an optimized service availability because of the possibility of transport in two directions along the ring. However this is not mandatory and other network configurations may also be used within the scope of the claimed invention such as for example single spur networks.

Figure 2:
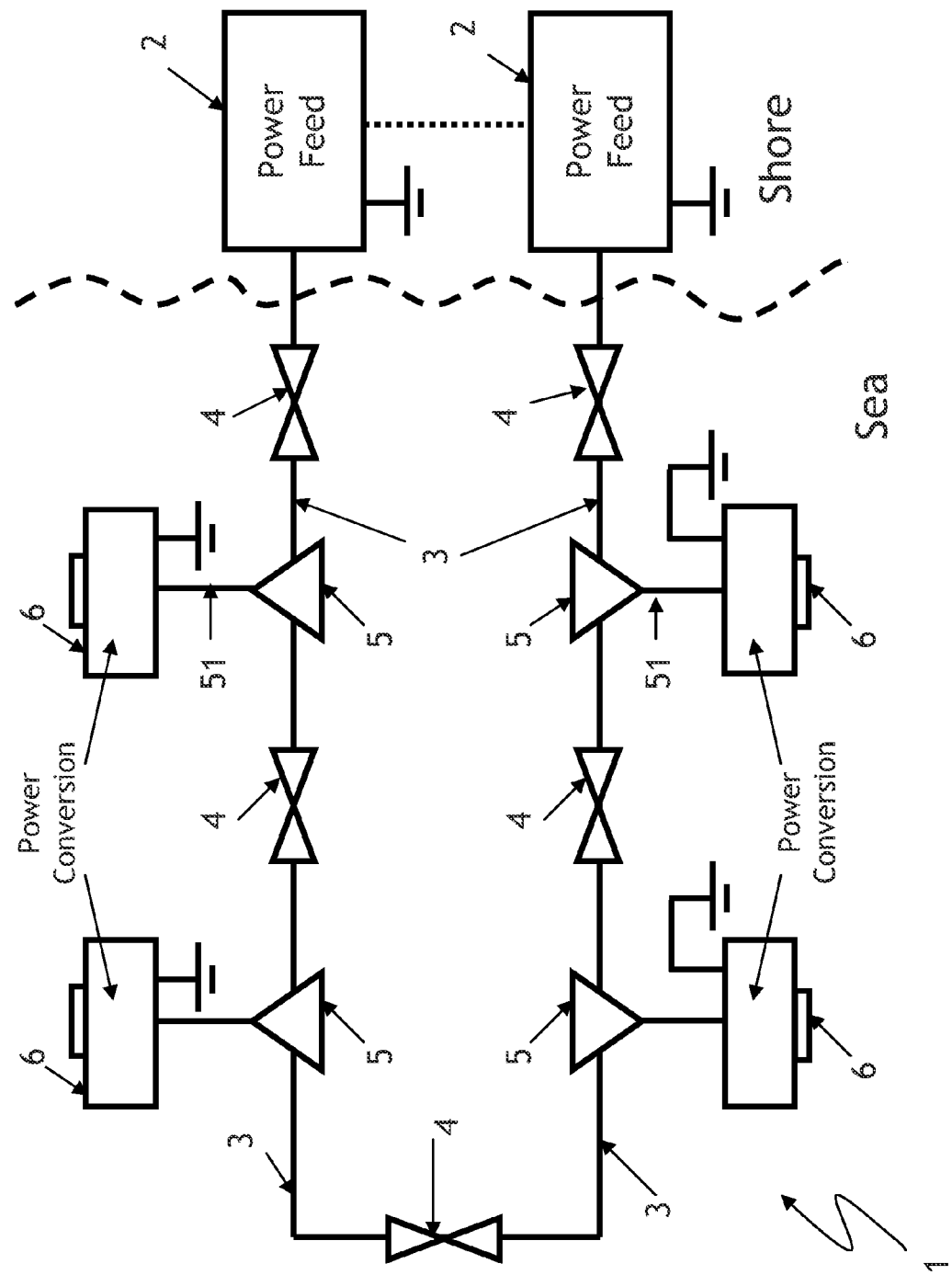
FIG. 2 is an exemplary representation of the network of FIG. 1 where some principles of power distribution are shown.

FIG. 2 is an exemplary representation of the network of FIG. 1 where some principles of power distribution are shown. In this figure like elements have been given like reference numerals as those of FIG. 1. In the example shown in FIG. 2, the terminal stations 2 may comprise power feeding equipment capable of supplying a relatively high DC voltage, for example of about 10 KV at different polarities.

In operation a supply voltage of for example about 10 KV may be provided on the trunk line 3.

At a branching unit 5 the power supplied on the trunk line 3 may be branched to a subsea node 6 by means of a branch line 51. The subsea node 6 is configured to convert the high voltage, about 10 KV in this example, to a lower voltage which is useable by the equipment at the corresponding site. In this example, the lower voltage may be about 400V. Some scenarios of power feeding are discussed in further detail in relation to FIGS. 4 to 8.

Figure 3:
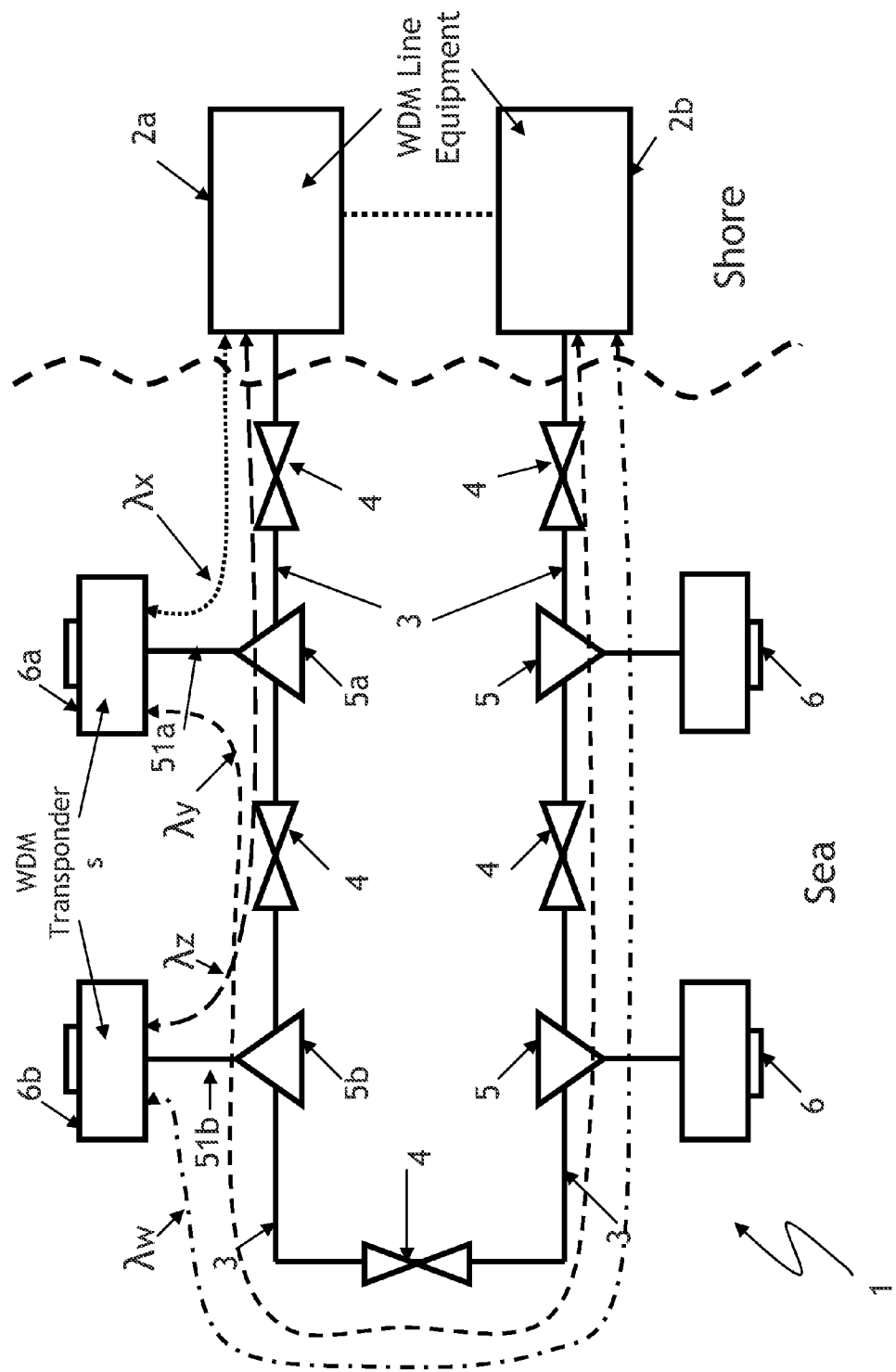
FIG. 3 is an exemplary representation of the network of FIG. 1 where some principles of optical communication are shown.

FIG. 3 is an exemplary representation of the network of FIG. 1 where some principles of optical communication are shown. In this figure, unless otherwise provided in the figure, like elements have been given like reference numerals as those of FIGS. 1 and 2. In the example shown in FIG. 3, the terminal stations 2 may comprise line equipment capable of transmitting/receiving optical wavelength on/from the trunk line. Preferably the line equipment in the terminal stations 2 may be capable of transmitting/receiving multi-wavelength optical signals such as for example WDM, CWDM, DWDM or type signals.

In the example shown in FIG. 3, the terminal stations 2 are assumed to be capable of transmitting/receiving a WDM type signal. As shown in the figure, a first terminal station 2a may exchange (transmit or receive) a first optical signal at a wavelength $\lambda x$ with a first subsea node 6a and a second optical signal $\lambda z$ with a second subsea node 6b. Likewise, a second terminal station 2b may exchange (transmit or receive) a third optical signal at a wavelength $\lambda y$ with the first subsea node 6a and a fourth optical signal $\lambda w$ with the second subsea node 6b. Subsea nodes 6, 6a and 6b may be equipped with transponders in order to enable receiving and transmitting wavelengths.

In operation a multi-wavelength optical signal (comprising λw, λx, λy and λz, among possible other wavelengths) may be provided on the trunk line 3—for example by means of respective sources providing different optical wavelengths on each terminal station 2a and 2b as well as on nodes 6a, 6b or other subsea nodes.

Repeaters may be used to re-amplify the optical signals, if desired.

At a branching unit 5a the multi-wavelength optical signal comprising wavelength λx is derived from the trunk line 3, for example by means of optical coupling, to the first subsea node 6a through the branch line 51a. The subsea node 6a then filters the wavelength λx that is intended for its use. This wavelength may be used for the purpose of enabling communication between the first subsea node 6a and the first terminal station 2a. Likewise, an optical signal with wavelength λy is branched in (added to) the trunk line 3 from the first subsea node 6a through the branch line 51a. This wavelength may be used for the purpose of enabling communication between the subsea node 6a and the second terminal station 2b. In a similar fashion, using branching unit 5b the multi-wavelength optical signal comprising wavelength λy is derived form the trunk line 3, for example by means of optical coupling, to the second subsea node 6b through the branch line 51b. The subsea node 6b then filters the wavelength λy that is intended for its use. This wavelength may be used for the purpose of enabling communication between the second subsea node 6b and the first terminal station 2a. Likewise, an optical signal with wavelength λw is branched in (added to) the trunk line 3 from the second subsea node 6b through the branch line 51b. This wavelength may be used for the purpose of enabling communication between the second subsea node 6b and the second terminal station 2b. Therefore, it may be observed that dedicated wavelengths may be allocated for communication between a terminal station and a subsea node.

Although not shown in the figure, it may also be possible to establish communication between two terminal stations. In case communication is desired between two terminal stations, it is sufficient to dedicate a specific wavelength between the two terminal stations where such dedicated wavelength is conveyed on the optical cable from one terminal station to the other without being dropped at any intermediate subsea node. The technique of adding or dropping wavelengths to or from the optical cable may be any technique known to a person skilled in the related art.

The above configurations allow for easy and reliable communication capabilities at high bitrates between any two points of communication in the network as desired.

Power feeding may be provided in a variety of manners. Some examples of scenarios are described below by way of illustration and not limitation. Other scenarios may also be possible within the scope of the claimed invention.

Figure 4:
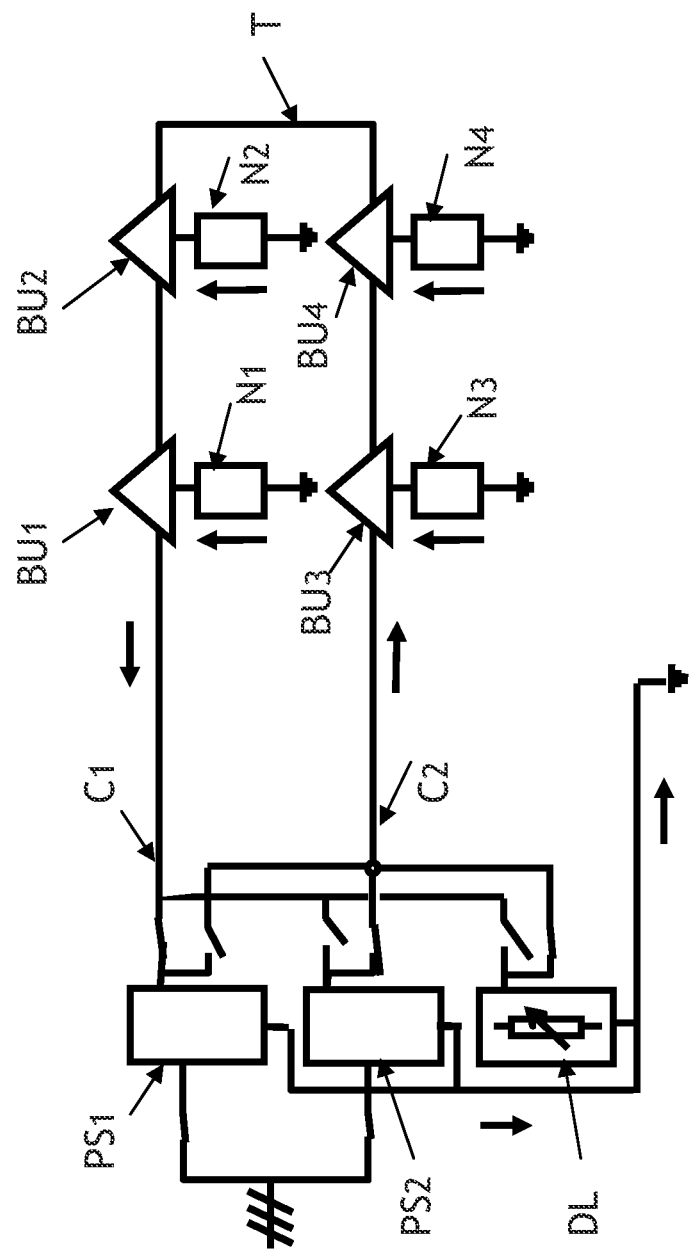
FIG. 4 is an exemplary representation of a first power distribution scenario according to some embodiments.

FIG. 4 is an exemplary representation of a first power distribution scenario according to some embodiments. In particular the scenario shown in FIG. 4 relates to a single-ended operation mode which may be considered a normal operation status (although two power supplies are available in the network, for example at terminal stations 2 in FIG. 1).

A first power supply PS1 is shown to be connected to a first cable head C1 of the trunk cable T, a second power supply PS2 is shown to be connected to a second cable head C2 of the trunk cable T. A dummy load DL may also be provided in the circuit. Branching units BU1, BU2, BU3 and BU4 are provided at certain locations along the trunk cable T. Each branching unit may be coupled to a respective subsea node N1, N2, N3 and N4. The trunk cable T is an optical cable capable of transporting power as well as optical signals.

In this status (typically, normal condition), both power supplies PS1 and PS2 may be for example at negative polarity, PS1 provides DC power (voltage-current) on cable head C1. As shown in the figure, (and arrows on the cable heads C1 and C2), a loop is closed between PS1 and the sea earth. On the other hand, the dummy load DL is preferably present on the circuit in order to ensure current circulation in the same direction. In order to increase (or ensure) the availability of power supply on the system, PS2 may be connected in parallel with the dummy load DL but put in standby mode (in order to be incorporated in the circuit in case of failure of PS1). Preferably the voltage of PS2 is adjusted below the voltage of the dummy load DL. Diodes may be used at the output of PS2 so as to prevent reverse current. Therefore, in this situation PS2 delivers no current.

In the normal operation scenario of FIG. 4, subsea nodes N1, N2, N3 and N4 may be serviced with electric current and optical signals for communication normally in case of need. The direction of current flow is shown by means of arrows in the figure.

In case of failure of the first power supply PS1, the second power supply PS2 may automatically take over the task of power feeding of the system.

Figure 5:
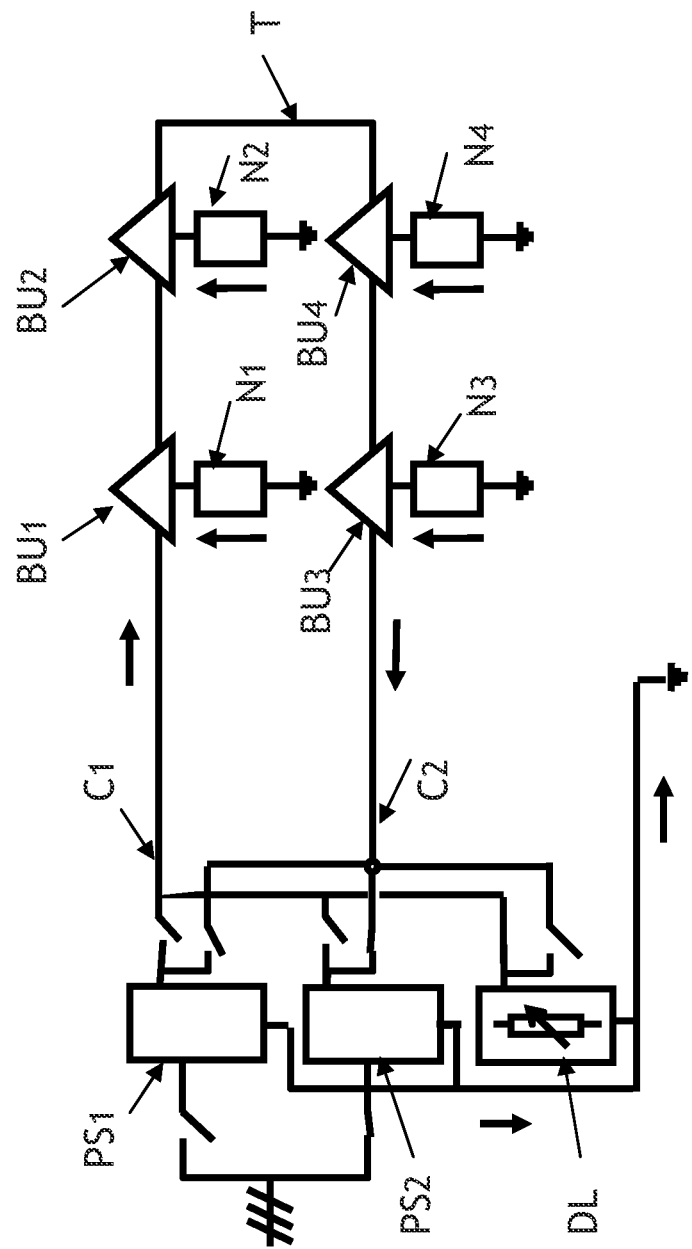
FIG. 5 is an exemplary representation of a second power distribution scenario according to some embodiments.

FIG. 5 is an exemplary representation of a power distribution scenario in which the first power supply PS1 has a failure (for whatever reason). In FIG. 5, like elements have been given like reference numerals as in FIG. 4. In such case, PS1 is disconnected from the circuit and PS2 is automatically incorporated in the circuit so as to ensure the current flow. Also in case of failure at a node or at the trunk cable, the second power supply PS2 ensures current flow and allows for a fast reconfiguration of one or more branching units. Therefore, in this second scenario, service (power and communication) is also ensured for the subsea nodes N1, N2, N3 and N4.

As seen in the figure in the scenario of FIG. 5, the dummy load DL is switched to the other cable head, namely C1. Preferably switching of the dummy load is performed in service at nominal voltage, closing the switch to cable head C1 in parallel with the switch to cable head C2 (also closed) and then opening the latter switch (the so-called make-before-break switching operation). The direction of current flow is shown by means of arrows in the figure.

Figure 6:
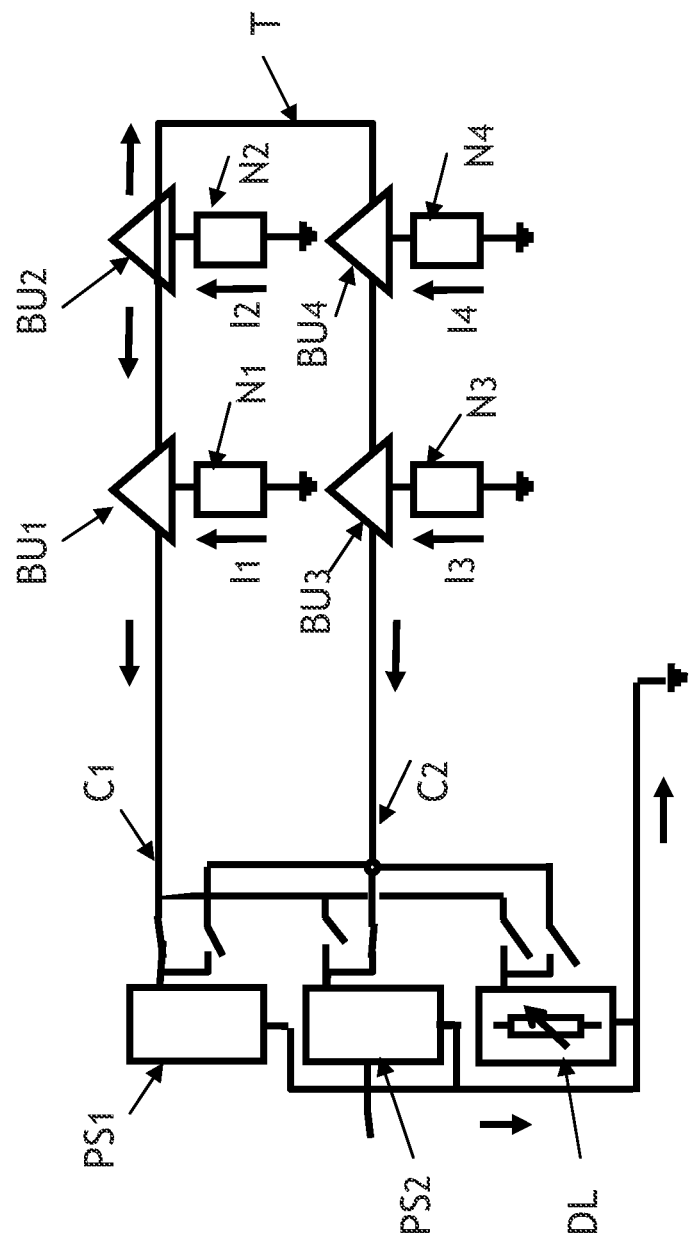
FIG. 6 is an exemplary representation of a third power distribution scenario according to some embodiments.

In case the requested overall power exceeds the capacity of a single power supply, the trunk cable may be fed by both power supplies PS1 and PS2, while the dummy load may be off (disconnected). FIG. 6 is an exemplary representation of a power distribution scenario under such circumstances. In FIG. 6, like elements have been given like reference numerals as in FIGS. 4 and 5.

The decision as to whether the two power supplies are to be incorporated in the circuit may be taken from a management system that may be located on terminal stations, based on current and voltage monitoring. The management system then may set the current and voltage demand to the power supplies PS1 and PS2 to balance the current equally in one of the nodes, for example N2 in the figure, such that no repeater may receive a too low current (close to zero). The reason for this concern is because repeaters are typically fed in series and need a minimum current (several hundred milliamps) to feed laser pumps and ensure optical amplification. If the power is received from both ends (PS1 and PS2) with voltages of same polarities, the current flows in opposite direction (as shown by arrows in FIG. 6) and there is necessarily a point in the system where the current must reverse. Therefore in order to ensure that there will not be a section between two branching units where the current falls near zero it may be desirable to force the current reversal to occur at a pre-defined branching unit location where the power consumption (and therefore the node current) is high enough, and to adjust the settings in the power supplies such that the current in this node is received substantially half from one direction and half from the other direction (e.g. if the node current is 1 A, the power supplies can be set to 0.5 A from one direction and 0.5 A from the other direction) and this may be also the minimum current in the whole system, because all other nodes add their current to the backbone up to the land station.

Thus the system may be set in double end feeding (except when the dummy load is failed) in cases where the node power is too high for the system to operate in single end feeding (the far end node has a voltage drop corresponding to cumulated drop of all the other intermediate nodes) and there is a power limit where the system collapses (when the node voltage is half of the PS1 voltage).

An algorithm may be used to this end in order to regulate DC voltage and current at both ends of the circuit (in double end feeding) and to guarantee a minimum current to all repeaters in the loop. Such algorithm may be based on arithmetic operations with the current measurement in the node N2 where the current balance is produced (for example using telemetry) and power feed equipment to determine the current demand. Therefore one power supply may be set in voltage control mode, and the other power supply is in charge of current control to maintain the overall current. Assuming that the first power supply PS1 is in current mode, PS1 may have its current set to: I=I1+I2/2. Therefore, the other power supply being in voltage mode delivers the rest of the current, thus I=I2/2+I3+I4.

Figure 7:
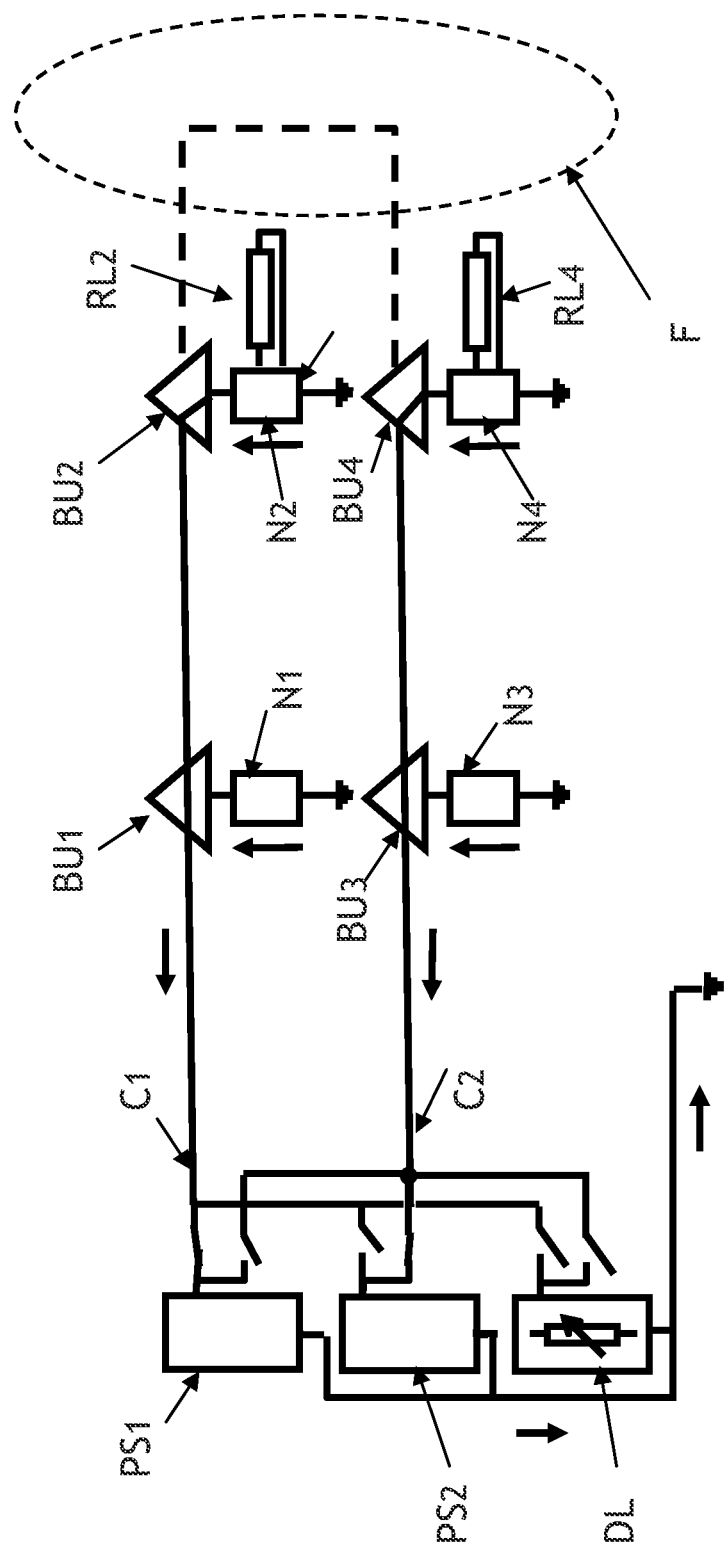
FIG. 7 is an exemplary representation of a fourth power distribution scenario according to some embodiments.

FIG. 7 is an exemplary representation of a fourth power distribution scenario in which double end feeding is available in case of a fault on the trunk cable. In FIG. 7, like elements have been given like reference numerals as in FIGS. 4 to 6.

Assuming that the trunk cable is under a faulty condition as shown by reference numeral F in FIG. 7 (for example a break in the trunk cable may cause the system to split in two separate circuits), each power supply PS1 and PS2 may be connected to a corresponding cable head C1 and C2 and the dummy load may be disconnected.

In this particular scenario, a resistive load may be automatically connected at the input of a node which is close to the faulty point in the cable. In such case the resistive load would support high voltage directly from the trunk. Alternatively, the resistive load may be connected at the output of the subsea node in which case it would support low voltage on the branch. In FIG. 7 subsea nodes N2 and N4 are shown to be connected to a respective resistive load RL2 and RL4. The resistive load may ensure the presence of a minimum current required to operate the optical system and may be automatically switched on in case of loss of optical communication. In case one of such subsea nodes N2 or N4 requires high power, the resistive load may be disconnected as it is typically a non priority load. The direction of current flow is shown by means of arrows in the figure.

Figure 8:
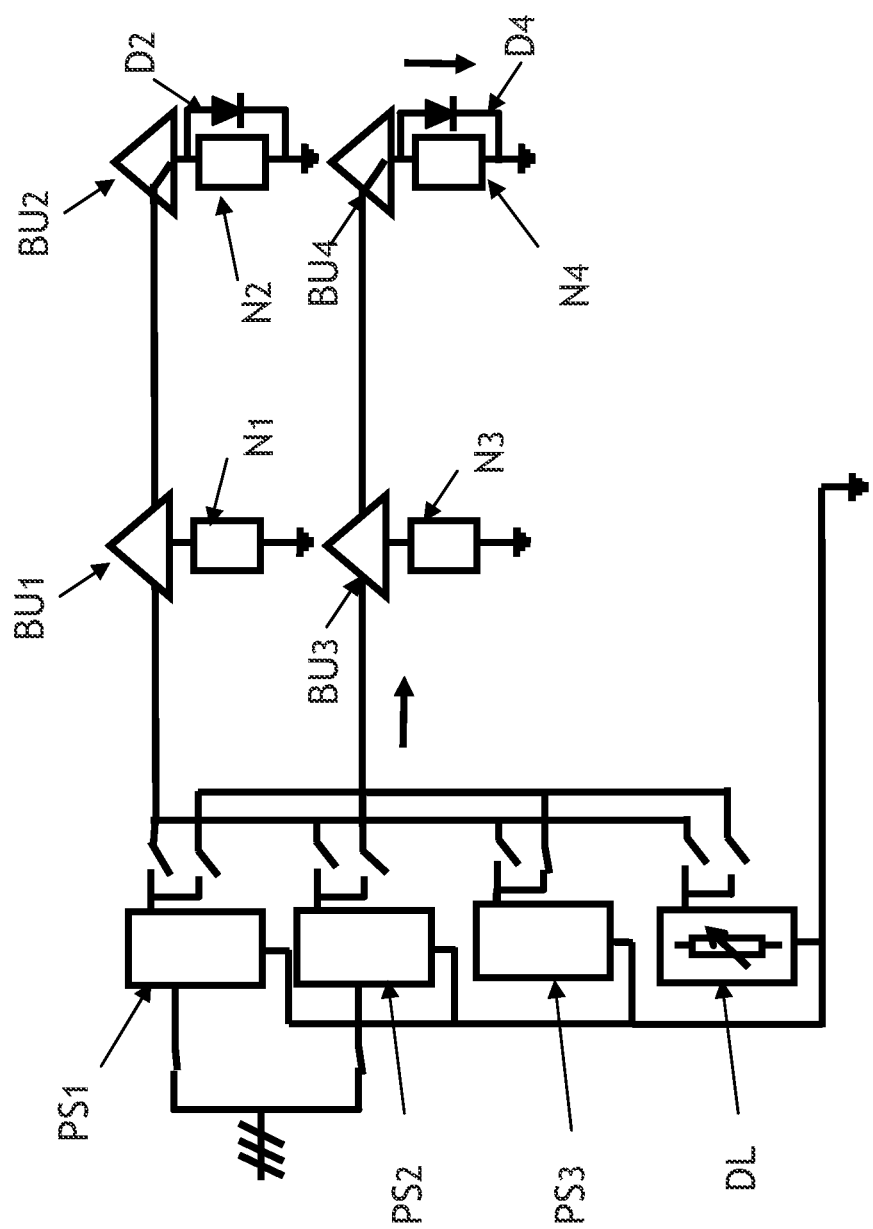
FIG. 8 is an exemplary representation of a fifth power distribution scenario according to some embodiments.

In the scenario of FIG. 7 where a trunk cable has suffered a break, it may become necessary to reconfigure the whole system. In order to do so, the branching units may need to receive specific commands. An exemplary solution for such reconfiguration operation is shown in FIG. 8. In this scenario, power supplies PS1 and PS2 are disconnected from the system. A third power supply PS3 is incorporated capable of operating at a reverse polarity power feeding mode so as to restore DC current on the trunk line as well as enabling communication in the system. This is done by means of reverse-biased diodes D2 and D4 at the input of a DC/DC converter inside the subsea nodes N2 and N4 (nodes that were next to the breaking point in FIG. 7). This provision of current enables a system manager to send commands to the branching unit that would need reconfiguration (in the case of this example, BU2 and BU4) and change the topology of the system as desired.

Figure 9:
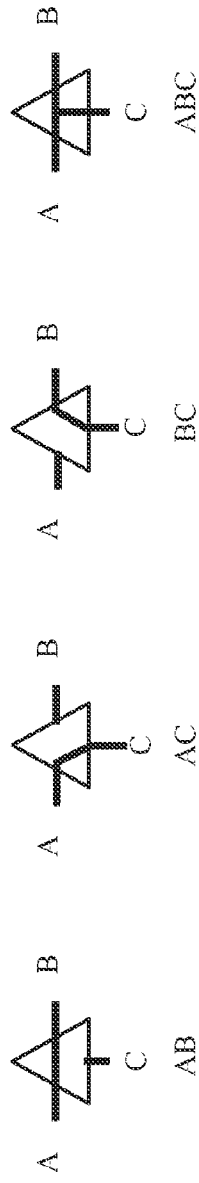
FIG. 9 is an exemplary representation of a number of connection configurations at a branching unit according to some embodiments.

The reconfiguration of the branching units is preferably performed by means of an optical supervisory signal capable of activating the branching units so as to change their connection configuration. FIG. 9 is an exemplary representation of a number of connection configurations at a branching unit according to some embodiments. In this figure, four possible stable connection configurations are shown. A first configuration AB, relates to providing connection between ports A and B and leaving port C open; a second configuration AC, relates to providing connection between ports A and C and leaving port B open; a third configuration BC, relates to providing connection between ports B and C and leaving port A open and finally a fourth configuration ABC relating to connecting the three ports A, B and C together. It is noted that two of the ports A, B and C may be connected to trunk line and the third one may be connected to the branch line.

In case a fault occurs in a branch cable of a branching unit, the systems may be configured to isolate the faulty cable and keep the overall system still available for providing service.

An example of a branching unit of the type useable in the network of the present invention is described in U.S. Pat. No. 6,987,902 which is herein incorporated by reference in its entirety.

Figure 10:
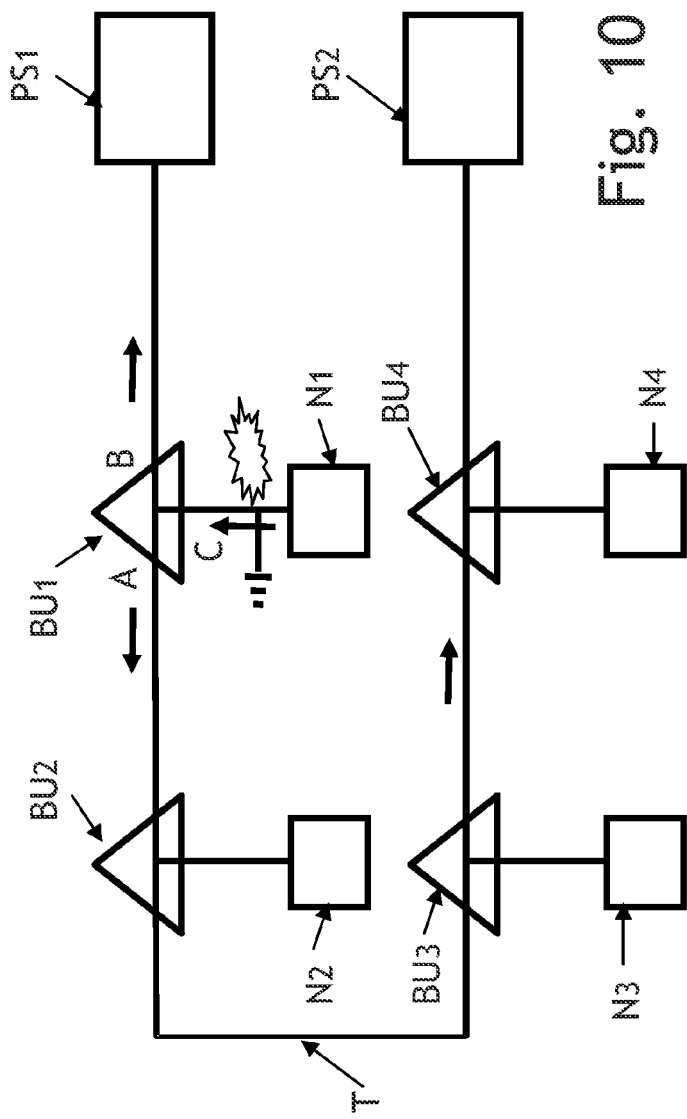
FIG. 10 is an exemplary representation of a first scenario under a faulty status according to some embodiments.

FIG. 10 is an exemplary representation of a first scenario in which a fault is shown to occur in a branching unit BU1. In case such fault is in the form of open circuit, the system may not suffer damages as only one subsea node N1 is isolated from the system while the other subsea nodes remain operational. However, in case such a fault status is in the form of a short circuit (as shown at node N1 in FIG. 10 and ports A, B and C in the branching unit BU1 are all connected together), then the system may be configured to automatically stop the conversion of the trunk voltage from the high values (for example of about 10 KV in normal conditions) to lower values (for example of about 500V in normal conditions) at the subsea nodes N2, N3 and N4. In fact, converters in each subsea node may be configured to stop the conversion operation if the trunk voltage falls below a predetermined threshold value, for example about 5 KV. In such a situation the system becomes an end to end series connection circuit from the first power supply PS1 to the second power supply PS2 with a new voltage supplied by the power supplies PS1 and PS2 which is substantially lower than the trunk predetermined threshold value (of 5 KV in this example). The direction of the currents in the circuit is shown by means of arrow in FIG. 10.

Figure 11:
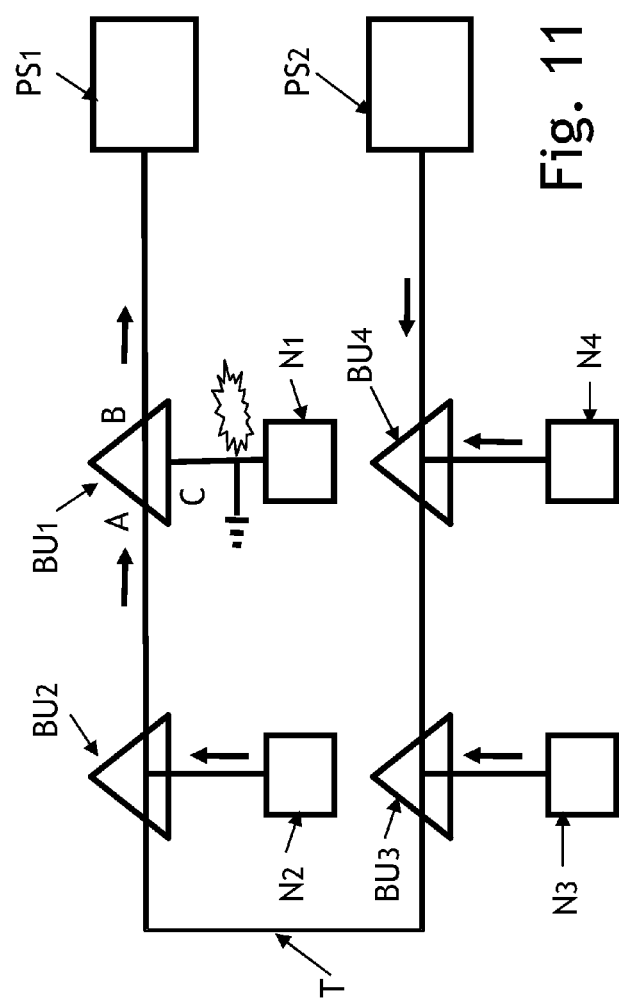
FIG. 11 is an exemplary representation of a second scenario under the faulty status of FIG. 10.

FIG. 11 is an exemplary representation of a second scenario under the faulty status of FIG. 10 where the system is made to restart after the clearance of the fault in the branch line of the branch unit 1. In this figure like elements have been given like reference numerals as in FIG. 10. As shown in FIG. 11, branching unit BU1 is reconfigured in a new status in which ports A and B are connected together, thus enabling continuity on the trunk line T. As the short circuit is now isolated from the circuit, the system may be restarted and subsea nodes N2, N3 and N4 may be provided with service. The directions of currents are shown by means of arrows in the figure.

Figure 12:
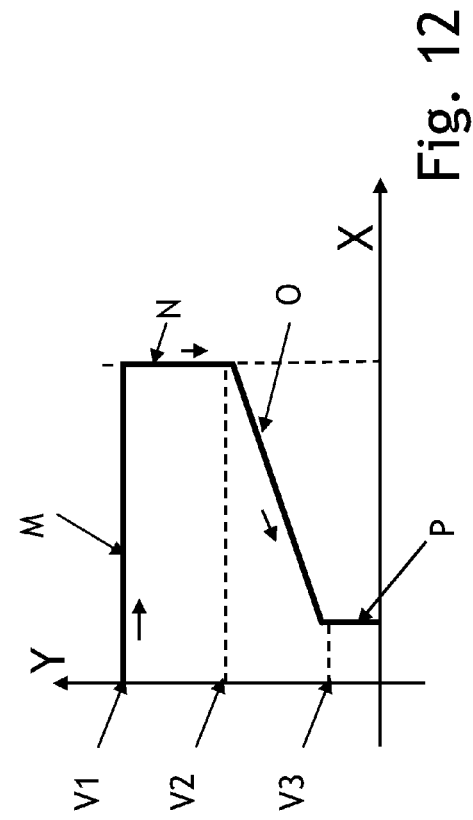
FIG. 12 is an exemplary graph representation of output voltage/current characteristics of a power supply in case a faulty status causes a short circuit in the network according to some embodiments.

FIG. 12 is an exemplary graph representation of output voltage/current characteristics of power supply in the system in the faulty status caused by a short circuit in the network according to FIGS. 10 and 11. In this figure, the X axis, i.e. the abscissa, shows the current limit in the trunk and the Y axis, i.e. the ordinate, shows the voltage supplied by the power supplies PS1 and PS2. The purpose is to keep the current in the trunk line T at a safe low value in case a short circuit, such as one discussed in relation to FIG. 10, occurs in a branch line. As shown in the figure, in normal conditions, the voltage available on the trunk line is at a first high value V1 (for example about 10 KV). This is shown in the figure by reference numeral M. In case the system experiences an increase in the current (along the X axis), the voltage drops to an intermediate value V2. This is shown in the figure by reference numeral N. The second voltage V2 may be established as the predetermined threshold value as described in relation to FIG. 10. As the voltage drops further below the predetermined voltage value V2, the subsea nodes stop the conversion operations and thus the system acts as a series connection with power supplies PS1 and PS2 supplying a safe low current. This is shown in the figure by reference numeral O. Finally, at a predetermined lower voltage V3, the system establishes a low current which is safe for the operation of the system, as shown in the figure by reference numeral P which allows a soft switching off of the branching units to clear the fault and restore automatically the DC power.

It is to be noted that while in the embodiments provided herein, two power supplies PS1 and PS2 are described in an exemplary manner, the network of the present invention is not necessarily limited to only two power supplies. Indeed, further power supplies may be present in the network within the scope of the claimed invention. For example the network may comprise an additional loop configured within the first ring (or parallel) network, or the network may simply comprise a third supply with three-branch network provided by leans of a simple T-type connection.

In case more than three, for example N, power supplies are incorporated in the system, an algorithm may be used in order to manage the power supplies based on the principle that at least one power supply is configured to control voltage and the remaining N−1 power supplies operate to control current in a similar fashion as described above in relation the embodiments using two power supplies.

As described above, the present invention provides a broad solution to bring power and optical communication over relatively large areas using a submarine cable available on the market.

The system as proposed herein may provide service to a variety of applications such as, but not limited to oil & gas scientific work as well as deep sea sensing work.

Due to the possibility of using submarine communication devices such as cable, branching units and repeaters that are typically qualified for 25 years design life, the system provides a relatively prolonged operation life (as compared to the known systems that do not use such submarine communications devices) despite a significantly high line current of up to about 8 A.

Elements such as power supplies, branching units, subsea elements and repeaters may include blocks which can be hardware devices, software modules or combination of hardware devices and software modules The various embodiments of the present invention may be combined as long as such combination is compatible and/or complimentary.

Further it is to be noted that the list of structures corresponding to the claimed means is not exhaustive and that one skilled in the art understands that equivalent structures can be substituted for the recited structure without departing from the scope of the claimed invention.

It should be appreciated by those skilled in the art that any block diagrams herein represent conceptual views of illustrative circuitry embodying the principles of the invention.

The invention claimed is:

1. A network for transporting communication and power, comprising:
    one or more terminal stations wherein said one or more terminal station may be a station located on land or a fixed or floating station located above sea level;
    at least one branching unit and at least one subsea node connected to a branching unit;
    the network further comprising a trunk cable for enabling optical and electric connections between said terminal station and said branching unit and between said branching unit and said subsea node;
    the at least one subsea node being adapted to receive a plurality of optical wavelengths and provide at least one optical wavelength at an output and being adapted to convert a first DC voltage received from said terminal station to a second DC voltage provided at an output, the first voltage being higher than the second voltage; and
    wherein the network comprises a first power supply connected to a first cable head of the trunk cable and at least a second power supply connected to a second cable head of the trunk cable, wherein the first power supply and the at least second power supply are adapted to supply at least a minimum amount of electric current in the network either individually or in combination, under normal or faulty conditions.

2. The network of claim 1 wherein the network comprises Internet Protocol switching means adapted for implementing Internet Protocol applications at an output of a subsea node.

3. The network of claim 1 wherein the network is a ring network.

4. The network of claim 1 further comprising at least one dummy load adapted to enable current circulation.

5. The network of claim 4 wherein the first power supply is configured to supply DC power on the first cable head such that a loop is closed between the first power supply and a sea earth and wherein the at least second power supply is connected in parallel with a dummy load in standby mode.

6. The network of claim 1 wherein the first power supply and the at least second power supply are configured to supply power, wherein the first power supply is set to control voltage and the at least second power supply is set to control current on the trunk line.

7. The network of claim 4 wherein the first power supply in configured to supply power to the first cable head of the trunk cable, the second power supply supplies power to a second cable head of the trunk cable, and a dummy load is disconnected, wherein a resistive load is connected at a node which is close to a faulty point in the network so as to ensure the presence of current in the subsea node.

8. The network of claim 7 wherein the network comprises a third power supply adapted for providing power feed, in case of a failure in the trunk cable, so as to restore DC current on the trunk line as well as enabling communication in the network.

9. The network of claim 1 wherein the network comprises a management system configured to set the current and voltage demand to the first and the least second power supplies so as to balance the current equally in at least one node in the network.

10. The network of claim 1 wherein the subsea node is configured to stop the conversion of the trunk voltage, in case of a fault in a branching unit, from the first voltage value to the second voltage value.

11. The network of claim 8 wherein the subsea node is configured to stop the conversion operation if the trunk voltage falls below a predetermined threshold value.

12. A method for transporting communication and power, in a network comprising one or more terminal stations wherein said one or more terminal station may be a station located on land or a fixed or floating station located above sea level, at least one branching unit and at least one subsea node connected to said at least one branching unit, the network further comprising a trunk cable for enabling optical and electric connection between said terminal station and said branching unit and between said branching unit and said subsea node, the method comprising the steps of:

receiving at the at least one subsea node a plurality of optical wavelengths and providing at least one optical wavelength at an output;

converting at the at least one subsea node a first DC voltage received from a terminal station to a second DC voltage provided at an output, the first voltage being higher than the second voltage;

wherein the network comprises a first power supply connected to a first cable head of the trunk cable and at least a second power supply connected to a second cable head of the trunk cable, wherein the first power supply and the at least second power supply, supply at least a minimum amount of electric current in the network either individually or in combination, under normal or faulty conditions.

13. The method of claim 12 wherein the subsea node derives the plurality of optical wavelengths and filters a wavelength that is intended for use of the subsea node, or the subsea node adds at least one wavelength to the trunk cable.

14. The method of claim 12 wherein the network further comprises a dummy load, comprising the step of switching the dummy load from a first cable head to a second cable head such that the switching is performed in service at nominal voltage by closing the switch to the second cable head while the dummy load is still switched also to the first cable head and opening the switch to the first cable head after the switching to the second cable head is performed.

15. The method of claim 12 wherein in case of an increase in current in the network the following is performed:

dropping a voltage available on the trunk cable to a threshold intermediate value;

stopping the conversion of voltage at subsea nodes;

supplying a current, lower than the increased current enabling a safe switching off of one or more branching units.

* * * * *